(12) United States Patent
Jessberger et al.

(10) Patent No.: US 7,143,736 B2
(45) Date of Patent: Dec. 5, 2006

(54) FILTER BOX WITH RESONATOR AND RESERVOIR

(75) Inventors: Thomas Jessberger, Asperg (DE); Anders-Christian Hoppe, Marbach (DE); Stephan Wild, Neuenbürg (DE); Dan Huff, Portage, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/151,239

(22) Filed: Jun. 14, 2005

(65) Prior Publication Data
US 2005/0279319 A1    Dec. 22, 2005

Related U.S. Application Data

(60) Provisional application No. 60/578,876, filed on Jun. 14, 2004.

(51) Int. Cl.
*F02B 77/04* (2006.01)
*F02M 35/10* (2006.01)

(52) U.S. Cl. .................... 123/198 E; 123/184.53; 181/228

(58) Field of Classification Search ............ 123/198 E, 123/184.53; 181/228
See application file for complete search history.

(56) References Cited

U.S. PATENT DOCUMENTS

| 5,913,295 | A  | * | 6/1999 | Sadr et al. ............... 123/198 E |
| 5,946,763 | A  | * | 9/1999 | Egner-Walter et al. .. 15/250.02 |
| 6,247,442 | B1 | * | 6/2001 | Bedard et al. .......... 123/198 E |
| 6,898,289 | B1 | * | 5/2005 | Vanderveen et al. ....... 381/71.4 |

* cited by examiner

*Primary Examiner*—Noah P. Kamen
(74) *Attorney, Agent, or Firm*—Crowell & Moring LLP

(57) ABSTRACT

An integrated engine compartment component for housing vehicle support system components in a vehicle engine compartment, which is divided by shared partition walls into a plurality of vehicle support system component-containing sections, each either forming or containing a component of a vehicle support system. In one embodiment, the integrated engine compartment component includes an air intake system filtration section containing a filter element, an air intake acoustic resonator section in two-way communication with an outlet of the air filtration section, and a washer fluid reservoir section feeding a windshield or headlight washer nozzle. An acoustic chamber may be integrated into the component outer surface, e.g., to use vehicle fluids stored therein to dampen noise and to provide additional fluid working volume. Integration of vehicle support system components into a single integrated component offers significant savings in under-hood engine compartment space and materials, manufacturing, installation, servicing and recycling costs.

19 Claims, 4 Drawing Sheets

FILTER BOX WITH RESONATOR AND RESERVOIR

CROSS REFERENCE TO RELATED APPLICATION

This application claims priority from U.S. provisional patent application No. 60/578,876, filed Jun. 14, 2004, the entire disclosure of which is incorporated herein by reference.

BACKGROUND OF THE INVENTION

The present invention relates to arrangement of vehicle components within an engine compartment, and in particular to an integrated air box, washer reservoir and acoustic resonator unit.

Motor vehicle engine compartments must accommodate, in addition to the vehicle's engine, a large variety of associated engine support system components, such as the engine air intake and filtration system housings, engine cooling radiator, hoses and fans, transmission cooling system components, electrical storage and distribution system components, heating and air conditioning system components, etc. Additionally, other non-drivetrain-related vehicle components, such as windshield wiper drive mechanisms and windshield and headlight washer system components, are often located in the engine compartment if necessary or convenient.

Traditionally, engine and drivetrain support system components have been individually designed and manufactured. Vehicle designers therefore have concentrated on finding a suitable location in the engine compartment for each individual component and adapting the component to the available space if necessary. This approach to vehicle design necessarily involves compromises, particularly in smaller vehicles where under-hood space is at a premium. For example, it may be desirable to locate an engine air intake pipe and filter housing directly adjacent to an engine intake manifold in order to minimize intake air flow resistance and thereby increase engine power output by increasing the amount of air drawn into the engine during the intake stroke. However, the air intake system typically ends up having its primary components (such as its filter housing) located at some distance from the intake manifold due to underhood space constraints, such as the need to fit the engine air intake pipe and filter housing under a desired hood shape, the need to accommodate the presence of other system components such as hoses, accessory belts, dipstick tubes, etc. near the air intake, and the need to share the scarce available under-hood volume with various components such as fluid reservoirs and the storage battery. The result is less-than-optimum intake air flow through a long, contorted air intake path extending, for example, between an air inlet near an inner fender and the engine intake manifold.

A further concern with current engine compartment arrangements is the loss of a significant amount of under-hood space as a result of the need to provide excess clearance between adjacent individual support system components. Such clearance must be provided to ensure the components do not damage one another due to, for example, relative motion during the operation of the vehicle or excessive component-to-component heat transfer, and to provide sufficient clearance to facilitate servicing of the components without undue interference from adjacent components.

Also becoming a greater concern is the need to meet increasingly strict radiated noise standards, as well as customer expectations for minimal drivetrain-generated noise in the passenger compartment. Previously, engine components have been formed in ways which have not significantly reduced radiated noise. For example, FIG. 6 shows a cross-sectional view of a prior art component sidewall, with a plastic outer wall 601 to which is bonded a corresponding pad 602, such as a fiber mat or foam layer. Similarly, FIGS. 7 and 8 show oblique inside views of a prior art plastic outer wall shell 701 and a molded foam liner 801 which is bonded to the plastic shell 701. These component sidewall structures have a number of practical disadvantages, however. For example, in many applications the inner foam liner must be chemically treated to provide fire resistance in the face of high underhood temperatures, the fire-retardant chemicals are often toxic, and due to the high temperatures, simpler (i.e., lower-cost) foam materials cannot be used. Further, because the foam or fiber mat materials cannot be recycled with the plastic outer shell, it must be separated from the shell, increasing recycling process difficulty and cost.

SUMMARY OF THE INVENTION

In view of the foregoing, it is an object of the present invention to provide an integrated component to be located in an engine compartment of a vehicle which provides more efficient utilization of the limited space in the compartment, while allowing elimination of foam or fiber acoustic shield material. This object is achieved by co-locating a plurality of compatible support system functions into a single component, preferably where at least one of the integrated support system sections is formed as a liquid-containing acoustic shield chamber.

It is a further object of the present invention to provide an integrated engine compartment component which can be produced at lower cost than the cost of individual components for each of the integrated support systems.

Another object of the present invention is to provide an integrated systems component which can be installed in a vehicle easier and at lower labor and equipment costs than the costs associated with installing a plurality of individual support system components.

It is a further object to provide an integrated systems component which can be serviced and/or replaced in a vehicle in the field easier and at lower labor costs than the costs of servicing and/or replacing a plurality of individual support system components.

Another object is to provide integrated acoustic shielding in an integrated systems component without use of insulating materials such as fibers or foam by creation of an acoustic insulation chamber between outer and inner walls of the integrated systems component.

A further object is to provide integrated acoustic shielding in an integrated systems component in which an acoustic insulation chamber is at least partially filled with a liquid such as a windshield cleaning fluid, air conditioning refrigerant, or an engine coolant.

It is another object to provide integrated acoustic shielding in at least one fluid-filled chamber of an integrated support systems component which is connected to a vehicle fluid system and increases the working volume of the fluid system while not consuming significant underhood space.

In one exemplary embodiment of the present invention, there is provided an integrated engine compartment component comprising an engine intake air box with an air-cleaning filter element, a washer fluid reservoir and an acoustic resonator.

The integration of these system components provides a number of advantages. By sharing common divider walls in the integrated component, no underhood space must be wasted to provide clearance between the components. The integrated component thus may utilize significantly less under-hood engine compartment volume. The engine compartment space made available by the smaller component may be used, for example, to improve arrangements of other components or allow additional system components to be moved into the engine-compartment (e.g., allowing a cruise control actuator located in the space between an inner and outer fender to be moved into the engine compartment to enhance its serviceability). The smaller integrated component may also ease engine compartment wire and hose routing problems. Alternatively, rather than decreasing the under-hood volume required by integrated component, portions of the integrated compartment may be made larger than possible with individual components to provide additional capacity, such as additional washer fluid and/or a larger intake air filtration element.

The integration of the engine intake air box, resonator chamber and washer fluid reservoir also offers the advantages of lower production costs. Costs for component manufacturers may be reduced because less material is needed to manufacture an integrated component than several individual system components, and the manufacturer may have lower tooling and other related manufacturing equipment costs (e.g., fewer component molds).

Vehicle manufacturers should also benefit from lower costs with an integrated engine compartment component, as the single component unit should be easier and faster to install as compared to installation of a plurality of individual components, decreasing labor and related installation costs (e.g., fewer mounting fasteners, fewer installation tools, etc.).

Further, vehicle maintenance facilities, and ultimately consumers, should benefit from cost savings from the integrated component, as servicing and/or removal of the component from the vehicle should be faster and easier than with several individual system components which must be separately handled.

Additional recycling benefits are realized from manufacture of the outer and inner shells made from the same recyclable material, such as hydrolysis-resistant plastics, eliminating the need for separating and disposing of an inner foam or fiber liner.

In another illustrative embodiment, a chamber of the integrated engine compartment component is formed between an outer shell of the component and an inner wall. The chamber may be left hollow or, as in this embodiment, be connected to an engine coolant circuit and contain engine coolant, with the engine coolant performing as an acoustic insulator, dampening noise generated in other chambers of the integrated support systems component. Advantageously, if coolant is stored in such an acoustic chamber, heat carried by the engine coolant may be used to maintain windshield washer fluid in an adjacent chamber of the integrated engine compartment component above its freezing point.

A further exemplary embodiment includes a plurality of integrated engine compartment components located in an engine compartment, each with at least one acoustic chamber formed between outer and inner walls of the component. A plurality of the acoustic chambers contain a vehicle fluid, such as washer fluid, engine coolant or a lubricating oil, to provide increased fluid system working volume and/or to increase fluid heat dissipation. Other acoustic shielding chambers may remain partially filled, or even empty hollow spaces.

In this embodiment, sufficient additional working volume may be provided to allow elimination of a separate, dedicated engine coolant expansion tank, further increasing available engine compartment space. In such an arrangement, components normally located on the separate expansion tank would be integrated into one or more of the plurality of integrated component chambers, such as the coolant system filler spout and cap, pressure equalization valve, and vent valve.

In a further embodiment, a fluid-containing acoustic chamber in each of the plurality integrated components is connected to a specific portion of an engine fluid system. For example, one engine coolant-containing fluid chamber may be connected to a cylinder head portion of the engine coolant circuit, while a second integrated component may be connected to a engine block portion of the engine coolant circuit. Alternatively, where sufficient engine compartment space is available, a single acoustic chamber may be formed with individual sub-chambers, with each sub-chamber serving a different portion of a fluid system. With either such embodiment, fluid flow control to and/or from individual chambers or sub-chambers and their respective fluid system portions may also be controlled by an electronic flow control computer, for example, in response to engine coolant flow requirements in different portions of the engine. Such a controller could, for example, selectively control flow from the individual coolant circuit portions, or in the case of a full load demand, the flow can be combined to maximize heat transfer from the coolant. Advantageously, most, if not all, of the cooling circuit management elements, such as flow control valves, thermostats, a water pump and temperature sensors, can be combined in a single module on the integrated support systems component.

In another embodiment, in order to enhance heat dissipation from a fluid in an acoustic shield chamber, the shell material (as well as supporting molded in ribs) may be made of so-called "CoolPolymers," plastics with high heat-conduction capacity. The chambers and/or sub-chambers also may be formed with transparent or translucent sections through which fluid level may be ascertained. Level detection alternatively could be provided with level sensors in the chambers monitored by an electronic control unit, which in turn could provide a remote indication or illuminate a light source in the appropriate low chamber to aid its identification. With the latter arrangements, unnecessary power use could be avoided by supplying the indicator light with current only when the engine compartment hood is open.

Other objects, advantages and novel features of the present invention will become apparent from the following detailed description of the invention when considered in conjunction with the accompanying drawings.

DETAILED DESCRIPTION OF EMBODIMENTS

Figure 1:
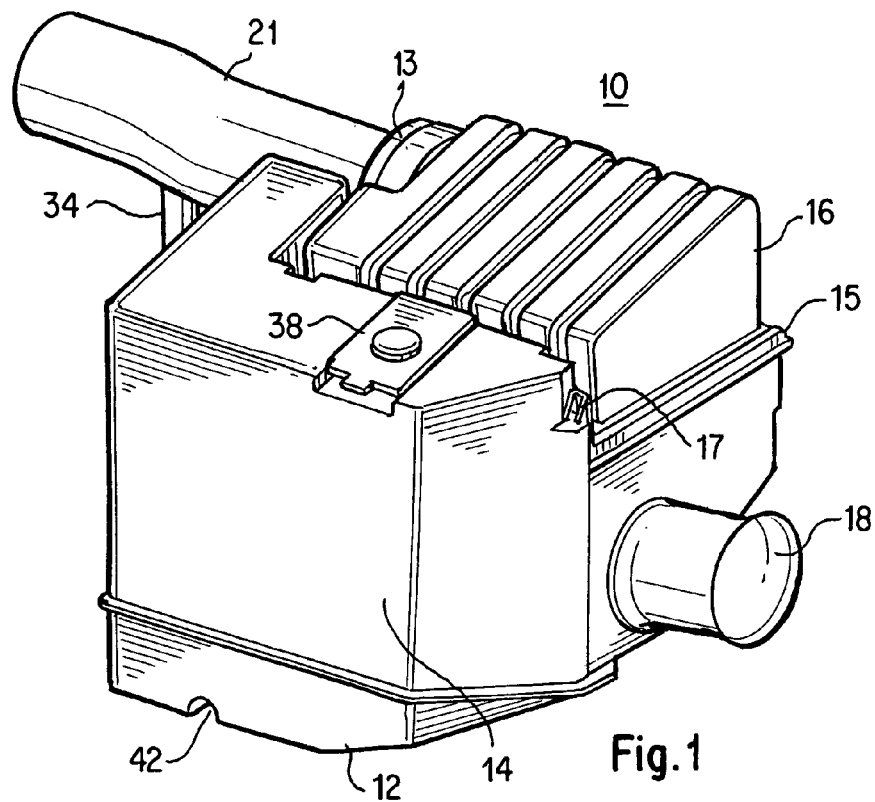
FIG. 1 is an oblique view of a first side of an integrated engine compartment component in accordance with an illustrative embodiment of the present invention.
Figure 2:
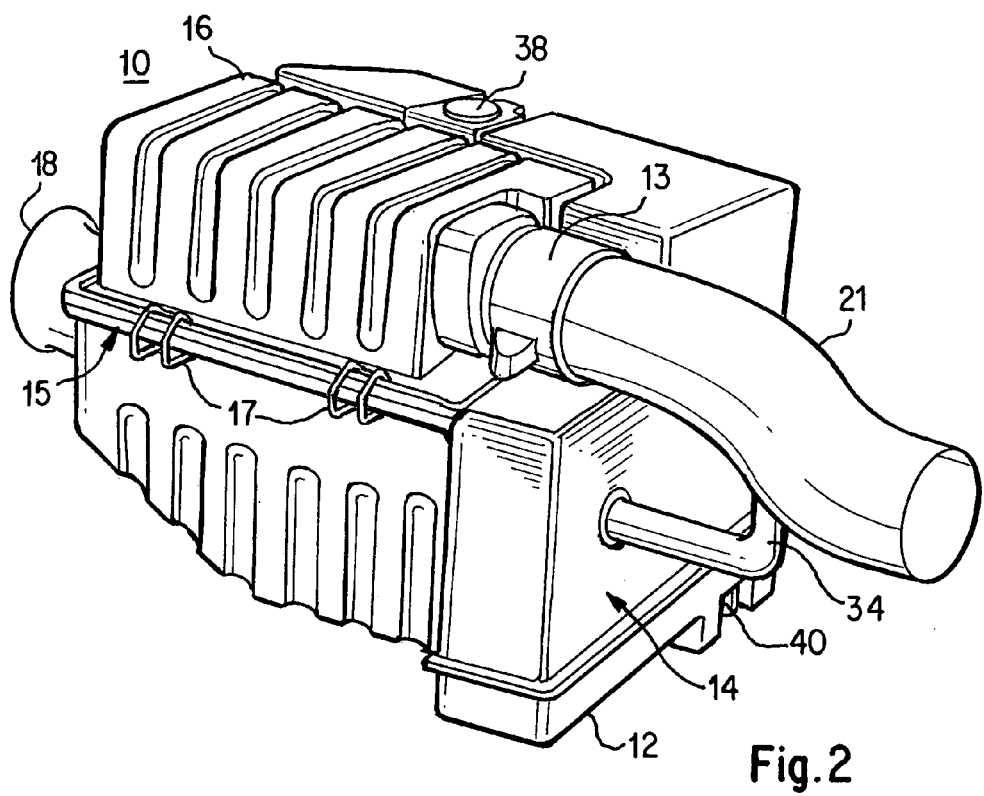
FIG. 2 is an oblique view of the opposite side of the integrated engine compartment component in accordance with the embodiment of the present invention shown in FIG. 1.

FIGS. 1 and 2 provide external views of one embodiment of the present invention, wherein an integrated engine compartment component 10, formed of a molded synthetic resin material, e.g., polyamide, houses an engine air intake volume with an air filtration element, a resonator chamber, and a washer fluid reservoir.

Integrated component 10 in this embodiment is formed in three principal subassembly portions: a base portion 12; a middle body portion 14; and a top cover portion 16. The base portion 12 in this embodiment forms the bottom walls of the washer fluid and resonator chambers, and therefore is joined to the middle portion 14 in a manner which seals and isolates the chambers, for example by friction welding or with a conventional plastic-compatible adhesive. The top cover portion 16 is releasably and sealably located on middle portion 14 by sealing flange 15 and retaining clips 17. The retaining clips 17 may be readily released to permit the top cover portion 16 to be removed for inspection and/or replacement of the air filtration element (not illustrated) located directly beneath top cover 16.

Air inlet 18, also known as a dirty air duct, directs air from the environment into the air intake volume. After the incoming air has passed through the air filtration element, it leaves the air intake volume through air outlet 21, also known as a clean air duct. In the present embodiment, air outlet 21 is arranged at a side of the top cover portion 16, and the top cover portion 16 is inset into the top of middle portion 14 such that the outlet duct does not protrude above integrated component 10. This compact design minimizes the overall height of the integrated component, further freeing space in the engine compartment. In addition, this arrangement permits a component such as a mass air flow ("MAF") sensor 13 to be mounted to the integrated component 10 in a position that is well protected from accidental damage and heat radiated by other engine compartment components, such as exhaust manifolds.

Figure 3:
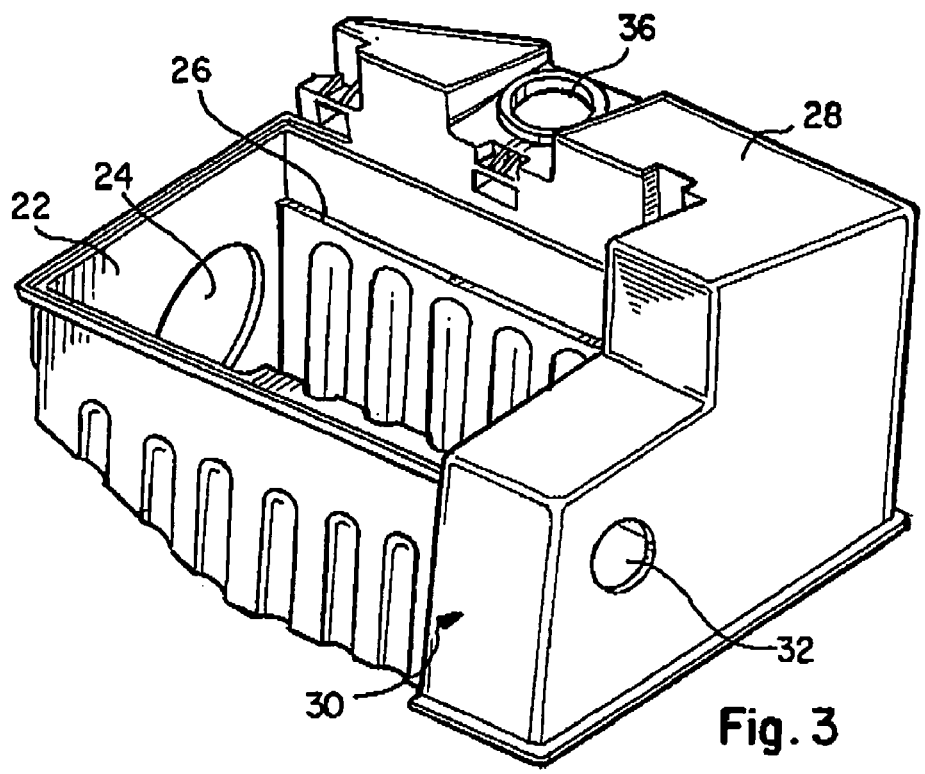
FIG. 3 is an oblique top view of a middle portion of the integrated engine compartment component in accordance with the embodiment of the present invention shown in FIGS. 1 and 2, oriented as shown in FIG. 2.
Figure 4:
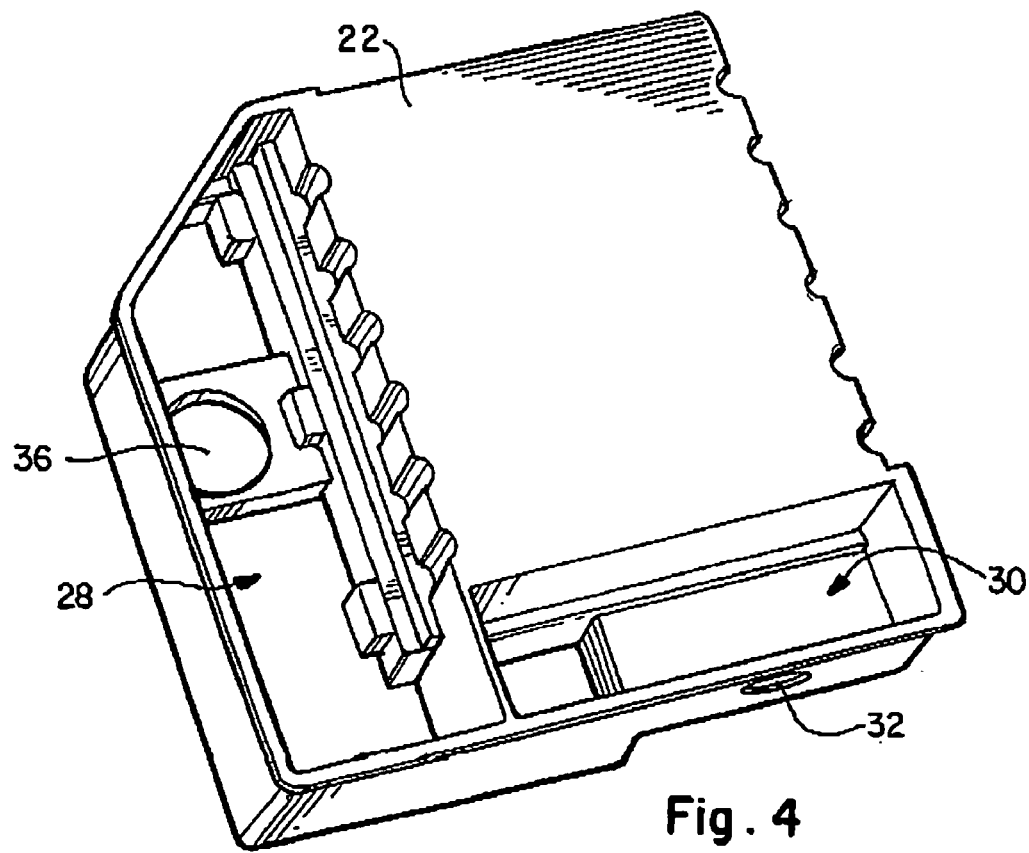
FIG. 4 is an oblique bottom view of the middle portion of the integrated engine compartment component shown in FIG. 3.

Referring now to FIGS. 3 and 4, the arrangement of the internal volumes of integrated engine compartment component 10 will be described. FIG. 3 is a view from above of middle portion 14; FIG. 4 is a view from the bottom of middle portion 14. As illustrated in FIG. 3, the dirty air side of air intake volume 22 is the largest compartment within middle portion 14. Air inlet 18 feeds air into air intake volume 22 though inlet hole 24. The air in the lower portion of air intake volume 22 then passes upward through a plate-style air filtration element (not illustrated) which is clamped between filter ledge 26 and top cover 16 (omitted in this view for clarity). Adjacent to the air intake volume 22 are vertical chambers 28 and 30, the interiors of which are visible in the bottom view of middle portion 14 shown in FIG. 4. Chamber 28 is a reservoir for washer fluid. Chamber 30 is a resonator chamber which communicates with air outlet 21 in a manner discussed further, below. The bottom of both chambers 28 and 30 are closed in this embodiment by base 12.

Resonator chamber 30 is connected through a vent hole 32 and hose 34 to air outlet duct 21, such that air pressure pulses may freely pass between the outlet duct and the resonant chamber and be reflected back toward the outlet duct as engine operating conditions dictate.

The washer fluid reservoir 28 includes a fill aperture 36 which is closed by a low-profile cap 38 which minimizes the overall height of the integrated component 10. Located at the bottom of reservoir 28 in base 12 is a washer fluid pump (not illustrated), which is powered via an electrical connection 40. The base 12 also has a washer fluid outlet (not illustrated) and a trough 42 which accommodates a washer fluid hose (not illustrated) connected to the washer fluid outlet. Both electrical connection 40 and trough 42 are molded into base 12 in a manner that both protects the washer fluid hose and the pump electrical connection from accidental damage and minimizes the height of integrated component 10.

Figure 5:
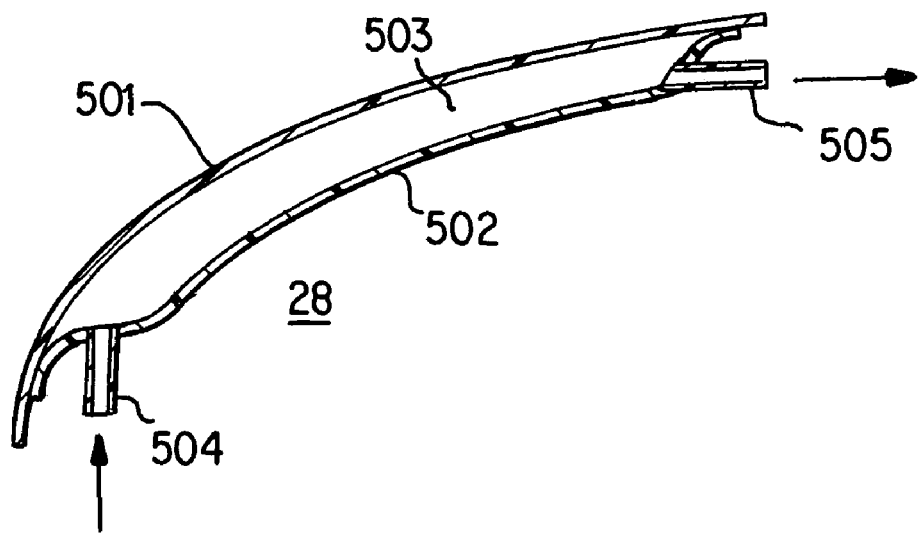
FIG. 5 is a cross-section view of an acoustic chamber section of another embodiment of an integrated engine compartment in accordance with the present invention.
Figure 6:
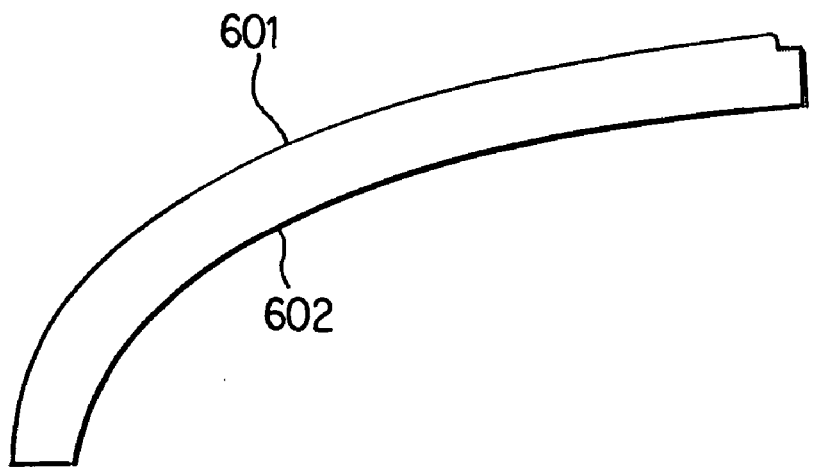
FIG. 6 is a cross-section view of a prior art component sidewall arrangement.
Figure 7:
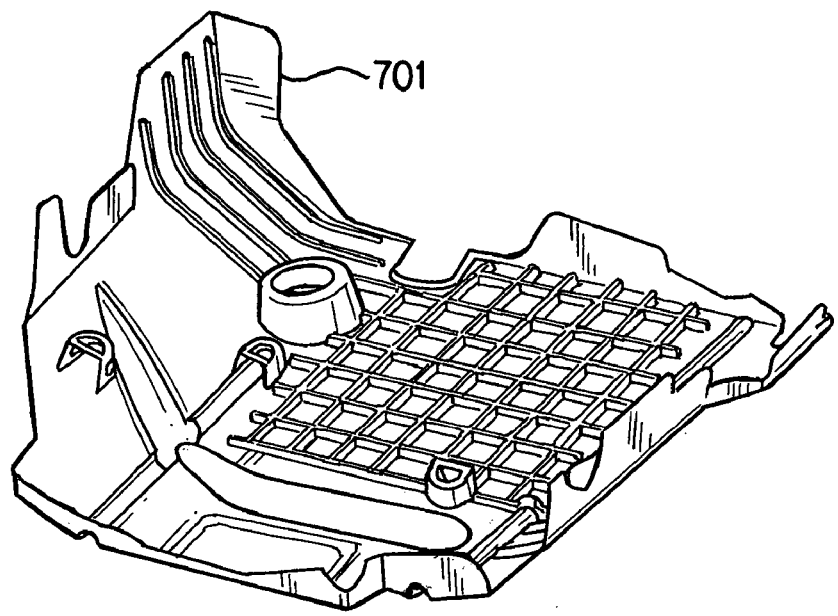
FIG. 7 is an oblique inner-side view of a prior art component sidewall shell.
Figure 8:
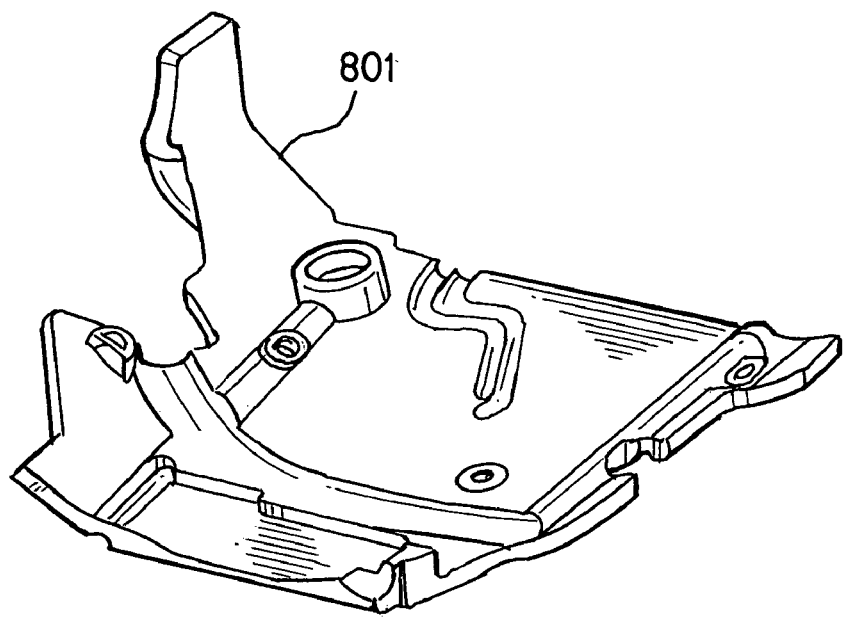
FIG. 8 is an oblique inner-side view of a prior art component sidewall foam liner.

A further aspect of the present invention is illustrated in FIG. 5. This figure shows a cross-section view of a sidewall of an integrated engine compartment component embodiment, such as may be formed with integrated engine compartment component 10 shown in FIGS. 1–4. For example, integrated compartment 10 may be formed with an outer wall 501, which is located over a wall of one or more of the integrated chambers. In FIG. 5, an outer wall of the washer fluid chamber 28 forms an inner wall 502 of acoustic chamber 503. Also schematically illustrated are engine coolant inlet tube 504 and engine coolant outlet tube 505, through which engine coolant may enter, and be drawn from, acoustic chamber 503.

Because the chamber 503 may extend over a large fraction of the outer surface of the integrated component 10, the chamber may have a large internal volume while not significantly increasing the outer dimensions of the component. This volume may be used to increase the working volume of the engine coolant circuit, which can be particularly advantageous when the vehicle is operated at high engine load during high ambient air temperatures. If the additional volume is great enough, the acoustic chamber 503 may, in addition to damping noise generated in the integrated component (such as air flow noise in air intake chamber 22 and resonator chamber 30), serve as a replacement for the usual engine coolant expansion tank. This can lower overall vehicle component costs by eliminating an additional underhood container, while also freeing additional engine compartment space for other uses. In this embodiment, outer shell 501 also has a translucent portion (not illustrated) through which the volume of coolant in the acoustic chamber may be viewed, and a filler cap and vent as used with an expansion tank (not illustrated) at an upper surface of the outer shell 501.

The outer shell 501 and inner shell 502 may be joined to one another by any of a number of well-known techniques, such as with adhesives or by plastic welding. Alternatively, because it is desirable to form the outer and inner shells from the same recyclable plastic material, chamber 503 may be formed in one piece using conventional molding techniques such as blow molding or GID or WIT processes. Whether formed from one or more plastic pieces, because the chamber shells 501, 502 of integrated engine compartment component 10 are formed from the same recyclable material, the component 10 may be easily recycled without the need to separate any dissimilar, non-recyclable shell lining materials.

An example of a particularly highly integrated component would incorporate the above acoustic chamber, as well as housing the majority of the components required for management of an engine coolant system, including a coolant pump (also referred to as a "water pump"), thermostat, and temperature sensor.

The foregoing disclosure has been set forth merely to illustrate the invention and is not intended to be limiting. For example, the integrated engine compartment component of the present invention may incorporate features of other systems than a washer fluid reservoir, intake air box, or resonator chamber, such as an electrical distribution fuse panel or a fuel vapor-recovery charcoal canister volume. Similarly, the integrated engine compartment component need not be formed from three portions (top, middle and base), but may be assembled or otherwise formed from fewer or more numerous portions, as desired. Since modifications of the disclosed embodiments incorporating the spirit and substance of the invention may occur to persons skilled in the art, the invention should be construed broadly to include all variations within the scope of the appended claims and equivalents thereof.

What is claimed is:

1. An integrated engine compartment component for housing a plurality of vehicle support system components in an engine compartment of a vehicle, comprising:
    an integrated housing, wherein
        the integrated housing is divided into a plurality of vehicle support system component-containing sections by at least one partition wall,
        each of the at least one partition walls is shared between at least two of the system component-containing sections,
        each system component-containing section forms or contains a vehicle support system component; and
        the integrated housing is shaped to fit within the vehicle's engine compartment, wherein
    there are at least three system component-containing sections, including:
    an air intake system air filtration section housing a filter element, an inlet to receive unfiltered engine intake air upstream of the filter element and an outlet downstream of the filter element for discharge of filtered intake air to an engine air intake;
    an air intake system acoustic resonator section formed as a hollow chamber and located adjacent to the air filtration section outlet, the acoustic resonator section having an opening connected to the engine air intake immediately downstream of the air filtration section outlet which permits two-way communication of intake air between the acoustic resonator section and the engine air intake; and
    a washer fluid reservoir section having an inlet to receive washer fluid and an outlet through which washer fluid is supplied to a windshield or headlight washer nozzle.

2. The integrated engine compartment component of claim 1, wherein at least one chamber is formed between an outer surface of the integrated housing and a wall of at least one system component-containing section.

3. The integrated engine compartment component of claim 2, wherein the integrated component is formed from a molded synthetic resin material.

4. The integrated engine compartment component of claim 2, wherein at least one of the at least one chambers has at least one opening for receiving a liquid or a gas associated with a vehicle support system.

5. The integrated engine compartment component of claim 4, wherein the vehicle support system is an engine coolant system.

6. The integrated engine compartment component of claim 5, wherein at least one of the at least one chambers includes at least one of an engine coolant system filler opening, a pressure equalization device, and a coolant level indicator.

7. The integrated engine compartment component of claim 4, wherein the flow of coolant from the at least one chamber is controlled in response to vehicle demands by an electronic coolant management control unit.

8. The integrated engine compartment component of claim 4, wherein each of the system component-containing sections has at least one opening for receiving a liquid or a gas associated with the system component-containing section's vehicle support system.

9. The integrated engine compartment component of claim 4, wherein
    the integrated engine compartment component is formed by assembly of a plurality of subassembly portions.

10. The integrated engine compartment component of claim 1, wherein each of the system component-containing sections has at least one opening for receiving a liquid or a gas associated with the system component-containing section's vehicle support system.

11. The integrated engine compartment component of claim 1, wherein the integrated component is formed from a molded synthetic resin material.

12. The integrated engine compartment component of claim 1, wherein
    the air filtration section has a removable cover at a top of the integrated housing arranged to permit replacement of the filtration element from the top of the integrated housing, and
    the washer fluid section inlet is located at the top of the integrated housing adjacent to the air filtration section removable cover.

13. The integrated engine compartment component of claim 12, wherein the at least a majority of the washer fluid section is arranged alongside the air filtration section.

14. The integrated engine compartment component of claim 1, wherein
    the integrated engine compartment component is formed by assembly of a plurality of subassembly portions.

15. The integrated engine compartment component of claim 1, wherein
    the integrated engine compartment component is formed by assembly of a plurality of subassembly portions.

16. The integrated engine compartment component of claim 15, wherein the plurality of subassembly portions includes a top cover portion, a middle portion and a base portion.

17. The integrated engine compartment component of claim 16, wherein at least one part of the top cover portion is removable.

18. The integrated engine compartment component of claim 16, wherein at least one part of the top cover portion is removable in a manner that permits removal of the filter element from the air filtration section or introduction of washer fluid into the washer fluid reservoir section.

19. An integrated engine compartment component for housing a plurality of vehicle support system components in an engine compartment of a vehicle, comprising:
    an integrated housing, wherein
        the integrated housing is divided into a plurality of vehicle support system component-containing sections by at least one partition wall,
        each of the at least one partition walls is shared between at least two of the system component-containing sections, each system component-containing section forms or contains a vehicle support system component; and the integrated housing is shaped to fit within the vehicle's engine compartment, wherein there are at least three system component-containing sections, including:

an air intake system air filtration section housing a filter element, an inlet to receive unfiltered engine intake air upstream of the filter element and an outlet downstream of the filter element for discharge of filtered intake air to an engine air intake, the air filtration section having a removable cover at a top of the integrated housing arranged to permit replacement of the filter element from the top of the integrated housing;

an air intake system acoustic resonator section formed as a hollow chamber and located adjacent to the air filtration section outlet, the acoustic resonator section having an opening connected to the engine air intake immediately downstream of the air filtration section outlet which permits two-way communication of intake air between the acoustic resonator section and the engine air intake; and a washer fluid reservoir section having an inlet located at the top of the integrated housing adjacent to the air filtration section removable cover to receive washer fluid and an outlet through which washer fluid is supplied to a windshield or headlight washer nozzle, wherein at least a majority of the washer fluid section is arranged alongside the air filtration section, and wherein each of the system component-containing sections has at least one opening for receiving a liquid or a gas associated with the system component-containing section's vehicle support system.

* * * * *